United States Patent

Horvath

[11] Patent Number: 6,073,585
[45] Date of Patent: Jun. 13, 2000

[54] AQUARIUM SAND FOUNTAIN

[75] Inventor: Tibor Horvath, Springfield, N.J.

[73] Assignee: Ethical Products, Inc., Newark, N.J.

[21] Appl. No.: 09/001,977

[22] Filed: Dec. 31, 1997

[51] Int. Cl.[7] .................................................. A01K 63/00
[52] U.S. Cl. ............................................................ 119/256
[58] Field of Search ..................................... 119/253, 255, 119/247, 256, 263; 239/17, 20, 21

[56] References Cited

U.S. PATENT DOCUMENTS

| 3,324,829 | 6/1967 | Dosamantes De Jose et al. | 119/253 |
| 3,409,223 | 11/1968 | Gosh | 239/17 |
| 3,880,116 | 4/1975 | Prillig et al. | 118/303 |
| 5,167,368 | 12/1992 | Nash | 239/17 |
| 5,326,032 | 7/1994 | Quillin | 239/17 |
| 5,476,068 | 12/1995 | Tonwsend | 119/256 |

Primary Examiner—Robert P. Swiatek
Assistant Examiner—Elizabeth Shaw
Attorney, Agent, or Firm—Helfgott & Karas, P.C.

[57] ABSTRACT

An aquarium fountain for the improved circulation in a cascading manner of a fixed quantity of particulate matter such as sand. The fountain includes a housing having a receptacle for containing and receiving the fixed quantity of sand. The housing includes an air lift tube having an inlet end in communication with the particulate matter to be circulated and an outlet end out of which the particulate matter is expelled. The outlet end of the air lift tube extends into an upper chamber of the housing. The upper chamber is configured to have an air pocket located between the outlet end and an air escape opening located in a wall of the housing.

20 Claims, 4 Drawing Sheets

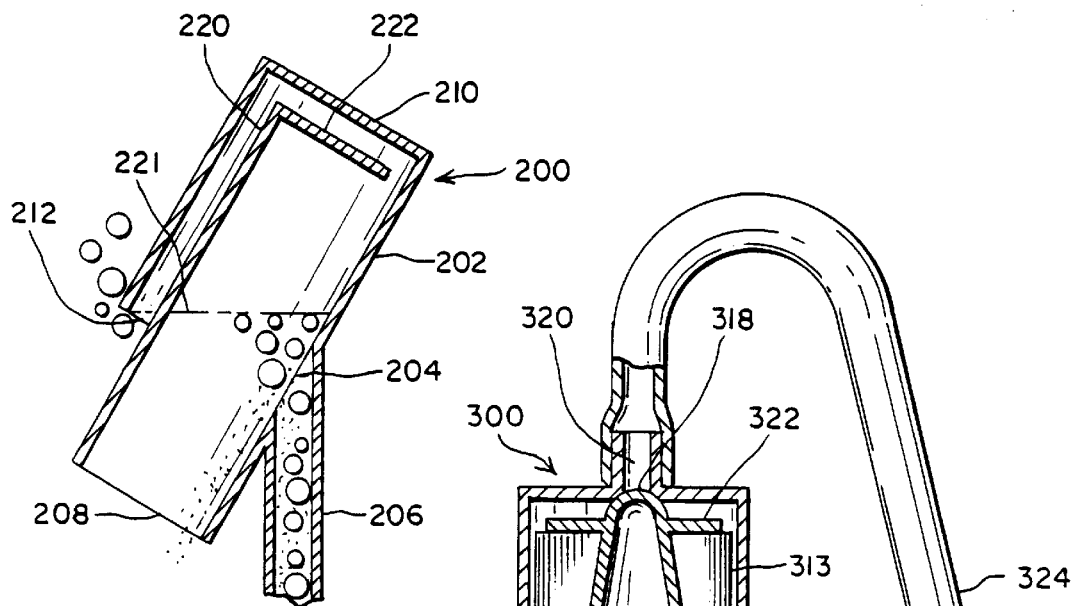
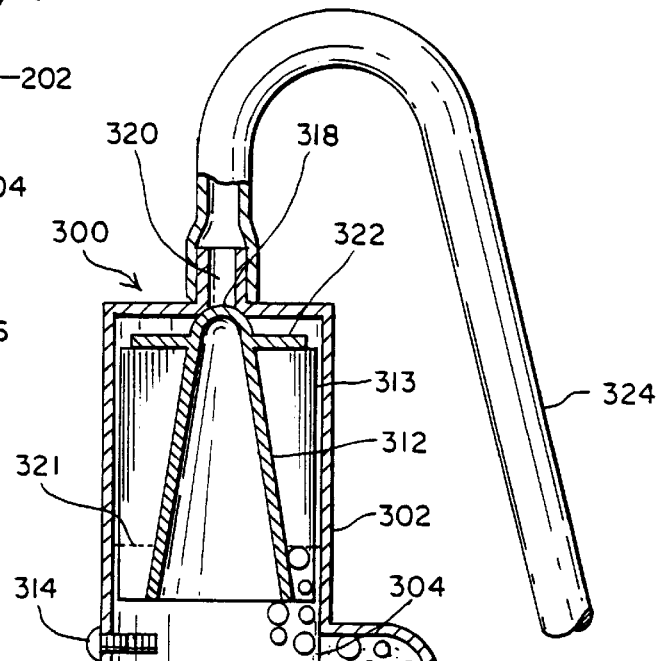
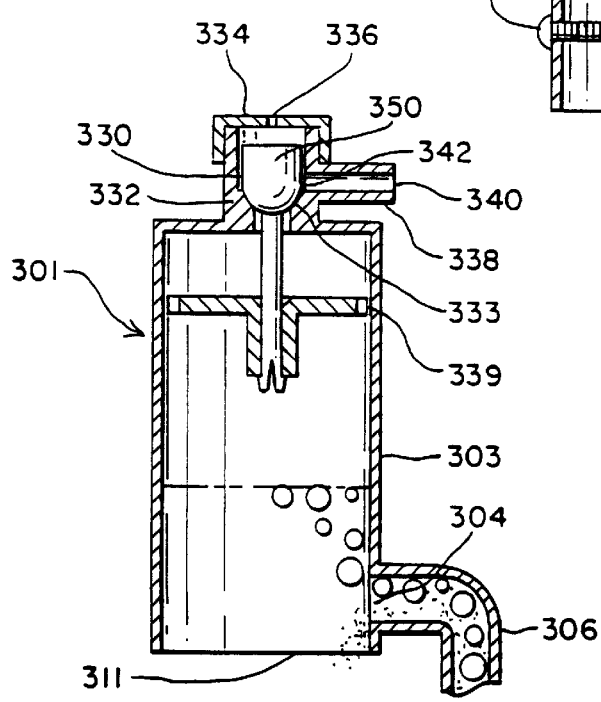

AQUARIUM SAND FOUNTAIN

BACKGROUND OF THE INVENTION

1. Field of the Invention

The present invention relates to an ornamental device which may be used in an aquarium to circulate particulate material in a cascading manner and more particularly to an ornamental aquarium fountain which is adapted to circulate a fixed quantity of sand in a cascading or waterfall like manner.

2. Description of the Prior Art

An aquarium sand fountain is primarily a decorative accessory which may be used to enhance the aesthetic appearance of an aquarium. As such, sand fountains may be designed to have any number of decorative or thematic facades which may add to the overall appearance of the aquarium.

Although primarily decorative, a sand fountain may serve the collateral purpose of helping to aerate the supply of water contained in the aquarium tank. As might be expected, the water in an aquarium tank must be regularly aerated in order to provide the occupying fish a fresh and ample supply of oxygen.

FIG. 1 illustrates a cross section of a typical example of a sand fountain 10 having been completely immersed in an aquarium tank. The prior art sand fountain 10 is generally constructed of a substantially hollow housing 10 having a lower chamber 14 and an upper chamber 16. The chambers are separated by a partitioning wall 18. As indicated in FIG. 1, the upper chamber is completely filled with water. Extending outwardly from the base of the housing is a receptacle or collector which is used to contain the fixed quantity of sand which is to be circulated in a cascading manner through the sand fountain 10. The housing 10 further includes a flexible air lift tube 26 which extends between the upper and lower chambers 14, 16. The air lift tube functions as the conduit through which the fixed quantity of sand is circulated.

As can be further seen in FIG. 1, the inlet end 28 of the air lift tube 26 partially extends through the housing wall and is in contact with the sand held in the collector 22. The opposite or outlet end 32 of the air lift tube 26 extends through an opening 34 provided in the partitioning wall 18 and is located adjacent a sand discharge opening 38 which is directly over the collector 22. In this manner as the sand is lifted upwardly through the air lift tube 26 and expelled through the outlet end 32, the sand which exits through the discharge opening 38 will again be collected for recirculation through the sand fountain.

In order to initiate the upward flow of sand held in the collector 22, a supply of air must be forced into the tube 26 at a point between the inlet end 28 and outlet end 32. In the typical example, the air lift tube 26 is provided with a nozzle 40 which extends from the section of the air lift tube 26 adjacent the inlet end 28. The air supply is introduced through a hose 42 which is attached to the nozzle 40 and which extends through an opening 44 in the back wall of the housing. Although not shown in the drawing, the air hose 42 continues through the tank water, over the neck of the tank and connects to an air pump which is typically energized through and electrical line.

In operation as air is pumped into the air hose 42 and into the air lift tube 26, a vacuum is created by the rising air which draws sand and water from the collector 22 up through the inlet end 28 of the air lift tube 26 and out through the outlet end 32. As the sand exits the air lift tube 26, it is expelled into the upper chamber where gravity causes the majority of the rising sand to gently cascade downwardly toward the collector 22 where the sand is recollected for further circulation through the fountain.

A portion of the sand, however, may remain trapped in air bubbles which result from the introduction of forced air. In order to permit the forced air and rising air bubbles to escape the chamber, an air escape opening 50 is provided at the center of the top wall 52 of the sand fountain 10.

In the past, a quantity of sand has been lost due to the sand trapped in the rising bubbles. In order to prevent the trapped sand from exiting through the air escape opening 50, the typical device teaches the use of a fine mesh screen 54 which acts as a barrier between the interior of the fountain and the remainder of the tank. As a rising air bubble strikes the mesh screen 54, the bubble is burst thereby releasing the trapped sand and allowing the sand to fall back toward the collector 22 along the partitioning wall 18.

Although this is a generally effective method of preventing sand from escaping through the air escape opening 50, over time sand may become trapped within the fine openings of the mesh screen 54. As the sand accumulates within the openings of the mesh screen 54, the flow of the escaping air bubbles is restricted. Eventually, the bubbles are forced from upper chamber 16 through opening 38. This is esthetically undesirable and leads to sand falling outside the range of the collector 22. Over time this results in the loss of a considerable quantity of sand.

A further problem which has been noted with the typical device is the use of the flexible air lift tube 26. Over time the air lift tube may kink and narrow the diameter of the air lift tube 26 thereby restricting the free flow of water and sand through the air lift tube 26.

A still further problem which has been encountered with the typical design relates to the placement of the outlet end 32 of the air lift tube in relation to the air escape opening 50 in the upper chamber of the housing. In particular, the placement of the air escape opening 50 in the top wall of the housing results in all the atmospheric air being forced out of the upper chamber by the rising water level as the sand fountain is immersed in the aquarium tank. In the fully immersed sand fountain the water level within the upper housing is thus at the maximum level adjacent the top wall.

Another problem associated with prior sand fountains is the clogging of air nozzle 40 and air hose 42 with sand when the air pump is turned off. Sand traveling through lift tube 26 settles downwardly by gravity and enters nozzle 40 when the air pump is deactivated. This can lead to clogging of the air nozzle.

A need therefore exists for a sand fountain which optimally transfers sand from the collector through the sand fountain housing and back to the collector without a significant loss of sand.

A further need exists for a sand fountain which permits the free escape of the introduced air without having trapped sand escape with the air.

A still further need exists for a sand fountain which allows for the free unrestricted passage of sand and air through the fountain housing.

Yet a further need exists for a sand fountain which provides for a pocket of air between the air lift tube and the air escape vent.

A need also exists for a sand fountain which prevents clogging of the air inlet nozzle with sand when the air pump is deactivated.

SUMMARY OF THE INVENTION

The present invention proposes overcoming the aforementioned problems with the typical sand fountain as well as providing other advantages. To that end, a sand fountain has been designed to maintain a pocket or barrier of atmospheric air in the upper chamber of the housing between the outlet end of the air lift tube and the top wall of the fountain. The air pocket in the upper chamber is the result of strategically locating the air escape vent or opening at a position along the housing wall of the upper chamber in such a manner that a quantity of atmospheric air is prevented from escaping the upper chamber during the immersion of the fountain. It is an object of the present invention that the resulting air pocket behaves as a barrier to the rising sand which might otherwise escape through the air escape opening.

The principle of construction of the sand fountain applies to sand fountains having internal upper and lower chambers of various shapes and dimensions. In a first preferred embodiment of the invention, the typical device may be adapted to accomplish the stated objectives of the present invention.

In the adapted sand castle, the air escape opening of the prior art device is closed off and a new air escape opening is provided in a side wall of the upper chamber of the housing. An elbow tube having an inlet end which extends partially within the upper chamber and an outlet end which is outside the housing and below the inlet end is provided within said new air escape opening. Between the outer perimeter of the elbow and the opening may be placed an adhesive or silicon seal or alternatively there may be used a grommet or gasket to prevent air and/or sand from escaping through this joint area.

The new configuration including the elbow ensures that as the sand fountain is immersed in the aquarium tank water the outlet end of the air escape vent is immersed in the tank water prior to the entire sand fountain having been immersed. In this manner, the water at the immersed outlet end of the elbow acts as a barrier to the air which would normally escape through the air escape opening. The result is that a quantity of air is trapped and an air pocket is formed within the upper chamber.

As can now be understood, the location of the air escape vent is only critical to the extent that a pocket of air is maintained within the upper chamber after full immersion of the sand fountain. The air pocket will function as a barrier which ensures that substantially all the rising sand exits through the discharge opening and not through the air escape opening. Accordingly, any number of configurations are possible which are conducive to the formation of an air barrier in the upper chamber.

To further improve the construction of the fountain, it is proposed to replace the flexible air lift tube of the prior art with a semi rigid tubing comprised of a plurality of sections of varying length. In particular the sand fountain of the present invention may utilize an upper section, a lower section, and a center or connecting section which joins the upper and lower sections to comprise the air lift tube. Preferably, the center section is provided with the air supply nozzle for introducing the external air supply.

As a further advancement over the typical device, the present invention may include a valve member housed within the upper chamber which is adapted to automatically modulate the amount of air trapped within the upper chamber.

Another advantage of the present invention is the provision of a filter in the air lift tube over the air inlet nozzle to prevent falling sand from clogging the nozzle when the air pump is deactivated.

The aforementioned objects, features and advantages of the invention will in part be pointed out with particularity and will in part become clear from the following more detailed description of the invention taken in conjunction with the accompanying drawings which form and integral part thereof.

BRIEF DESCRIPTION OF THE DRAWINGS

In the drawings:

FIG. 4 is cross sectional view of a portion of a sand castle of a third embodiment in accordance with the present invention;

FIG. 5 is cross sectional view of a portion of a sand castle of a fourth embodiment in accordance with the present invention; and FIG. 6 is cross sectional view of a portion of a sand castle of a fifth embodiment in accordance with the present invention;

DETAILED DESCRIPTION OF THE PREFERRED EMBODIMENTS

Figure 1:
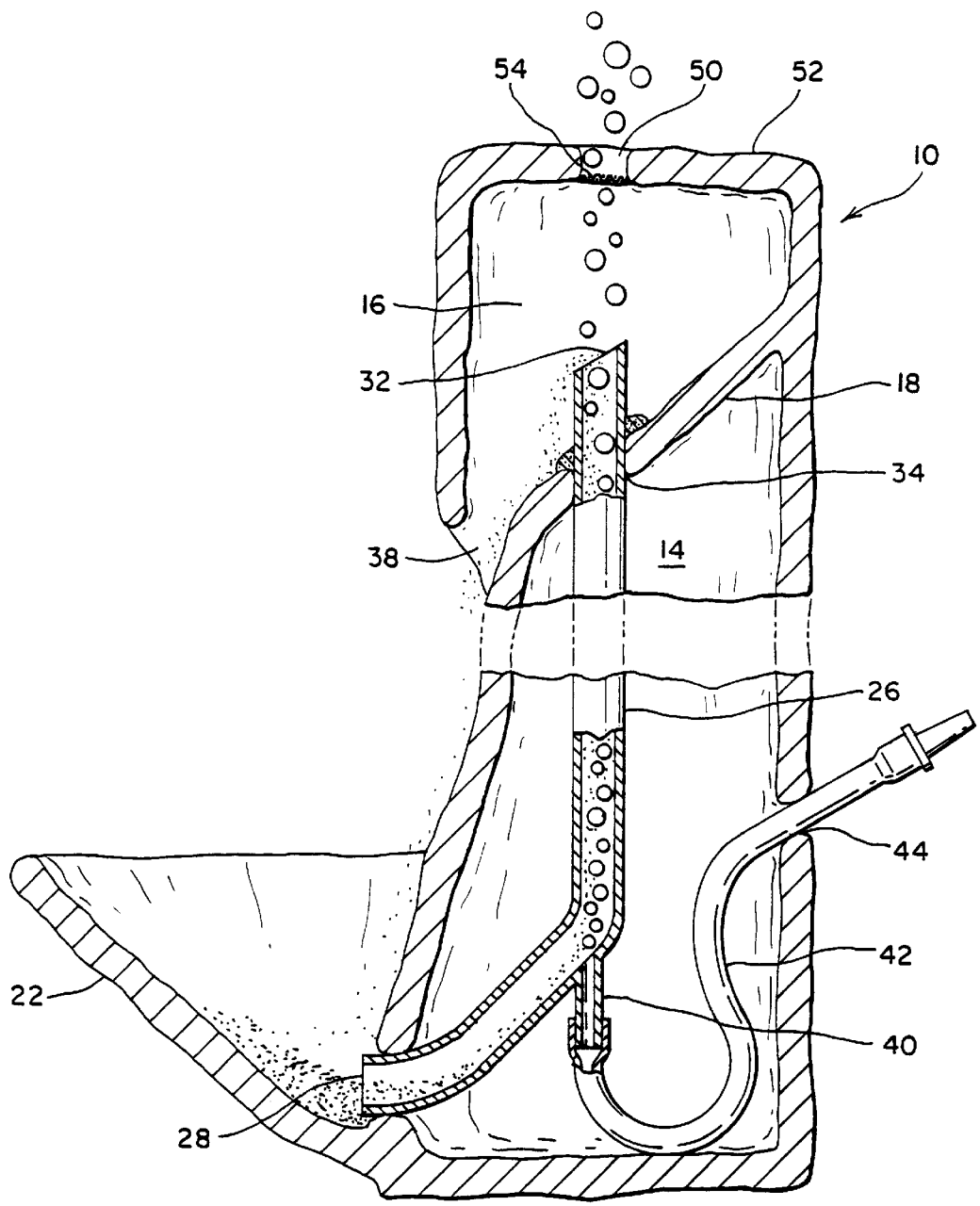
FIG. 1 is a cross sectional view of the components forming the typical example of a sand fountain of the type.
Figure 2:
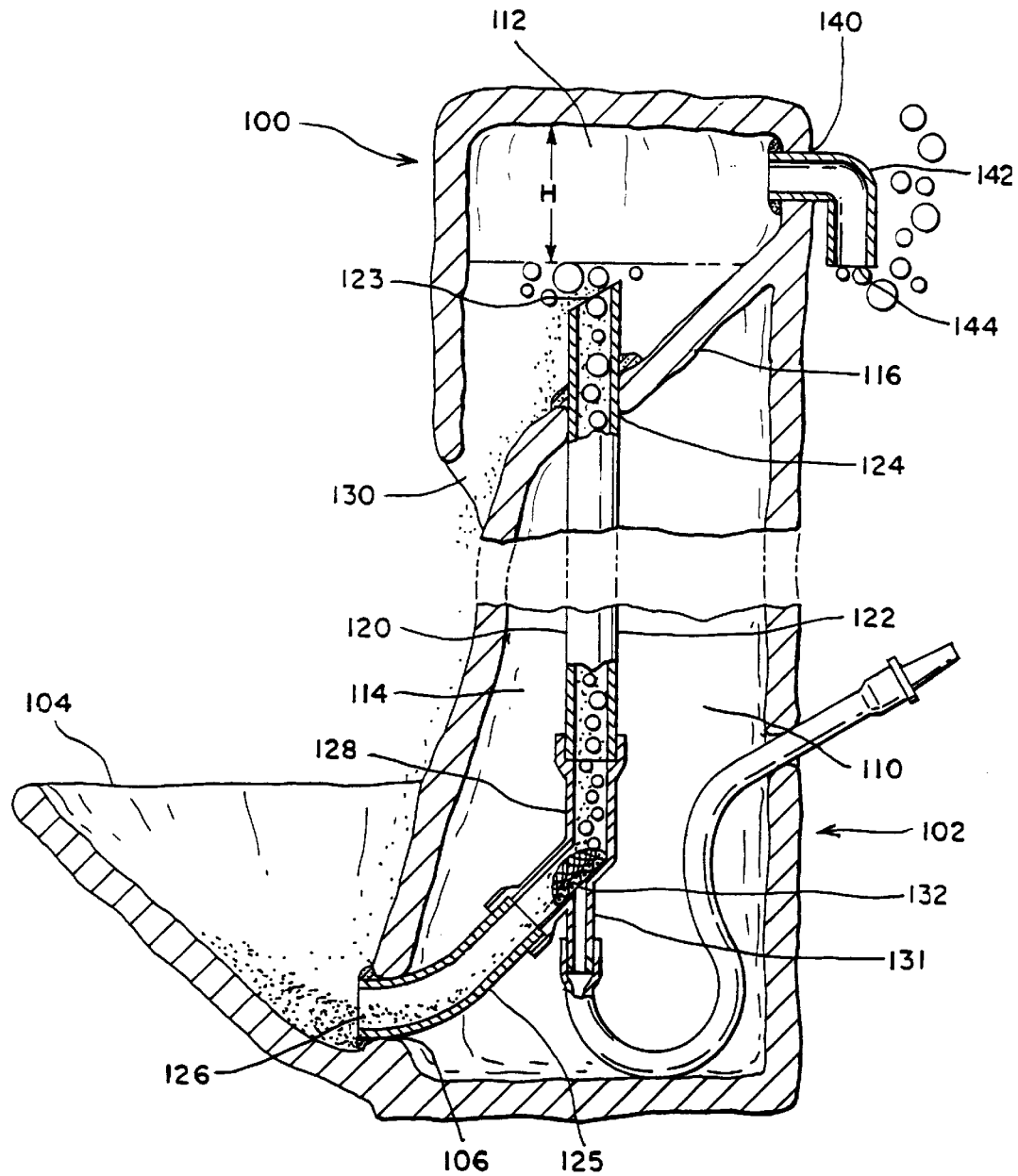
FIG. 2 is a cross sectional view of the typical example of a sand fountain which has been modified in a first embodiment to include the features and advantages of the present invention.

Referring to the drawings, and specifically to FIG. 2 the device according to a first embodiment of the invention includes a sand fountain 100 which has been immersed in a tank of water. It should be immediately apparent from the figure that the modified device includes an air pocket having a height "H" within the sand castle.

The sand fountain includes a housing assembly 102 having a collector or basin 104 positioned at the foot of the housing assembly. The section of the housing wall adjacent the collector is provided with an opening 106 allowing communication between the interior 110 of the housing and the collector 104. The interior of the housing assembly generally includes an upper chamber 112 and a lower chamber 114. The chambers are separated by a sloping partitioning wall 116. Within the lower chamber 114 is contained the major portion of an air lift conduit or tube 120 which extends substantially between the partitioning wall and the housing opening 106.

As shown in FIG. 2, the air lift tube 120 includes three independent sections: a first or upper section 122 of the air lift tube having an outlet end 123 which extends through a complementary opening 124 in the partitioning wall 116 into the upper chamber 112; a second or a lower section 125 having an inlet end 126 which extends through opening 106; and an elbow 128 which connects the upper and lower sections 122, 125 and which includes an intake nozzle 131 for connection to an external air supply.

Although the above described air lift tube 120 is preferable, it should be apparent that any number of design changes can be implemented without significantly impairing the functionality of the air lift tube 120. The modular design of the air lift tube 120, however, is preferable as it allows the air lift tube to be varied to accommodate ornaments of varying heights. In order to avoid the possible occurrence of pinching or kinking in the tube which could affect the upward flow of sand and water, the individual sections of the air lift tube 120 are preferably made of a shaped rigid plastic tubing or piping.

A filter 132 of meshed or screen material may be disposed over intake nozzle 131 to prevent sand from clogging the nozzle and air hose when the pump is turned off. Any sand entrained in the water flowing through the air lift tube will settle downwardly upon deactivation of the air pump. Filter 132 is sufficiently fine to prevent the falling sand from entering nozzle 131. When the air pump is turned on again, air will blow any sand off the filter and through the tube.

Referring back to the drawing, the upper chamber 112 includes a sand and water discharge opening 130 which is positioned at the foot of the partitioning wall 116 and directly above the collector 104. The upper chamber 112 further includes an air escape opening 140 which is provided on a side wall of the housing opposite the discharge opening 130. The air escape opening 140 is laterally offset from the outlet end 123 of the air lift tube in order to give the rising sand a greater opportunity to fall back toward the collector instead of through the escape opening.

In order to trap a sufficient quantity of atmospheric air in the upper chamber, the air escape outlet 140 is lowered in relation to the top wall of the sand castle through the provision of a substantially 90 degrees elbow tube 142. The elbow tube extends from the air escape outlet 140 to an outlet end 144 which is below the air escape outlet 140 and above the outlet end 123 of the air lift tube 120. In operation, as the fountain is immersed, atmospheric air in the upper chamber is forced out through elbow tube 142 until such point as the outlet end 144 comes into contact with the aquarium tank water. At that point, the tank water prevents any further atmospheric air from escaping the upper chamber through elbow 142. Because the air is prevented from escaping, an air pocket is created having a height "H" which extends substantially between the top wall or roof of the housing and the outlet end 144 of the elbow 142.

As discussed previously, the external air which is introduced into to the air lift tube 120 draws sand held in the collector and water into the upper chamber 112. The rising air may be in the form of air bubbles which burst upon impact with the air in the air pocket in the upper chamber 112. The bursting bubbles release any sand which may be trapped within a bubble. The released sand settles back toward the collector 104. In this manner sand is prevented from escaping the upper housing.

The sand fountain of a second preferred embodiment is substantially similar to that of the first embodiment. Accordingly, common elements in the first and second embodiments have been numbered alike. In the second embodiment, the placement of the air escape opening 150 has been lowered with respect to the top wall of the sand castle thereby rendering the elbow 142 of the first embodiment unnecessary. Additionally the partitioning wall 116 has been shortened to permit the air escape opening 150 to be located at a height along the housing wall which is below the partitioning wall 116.

Figure 3:
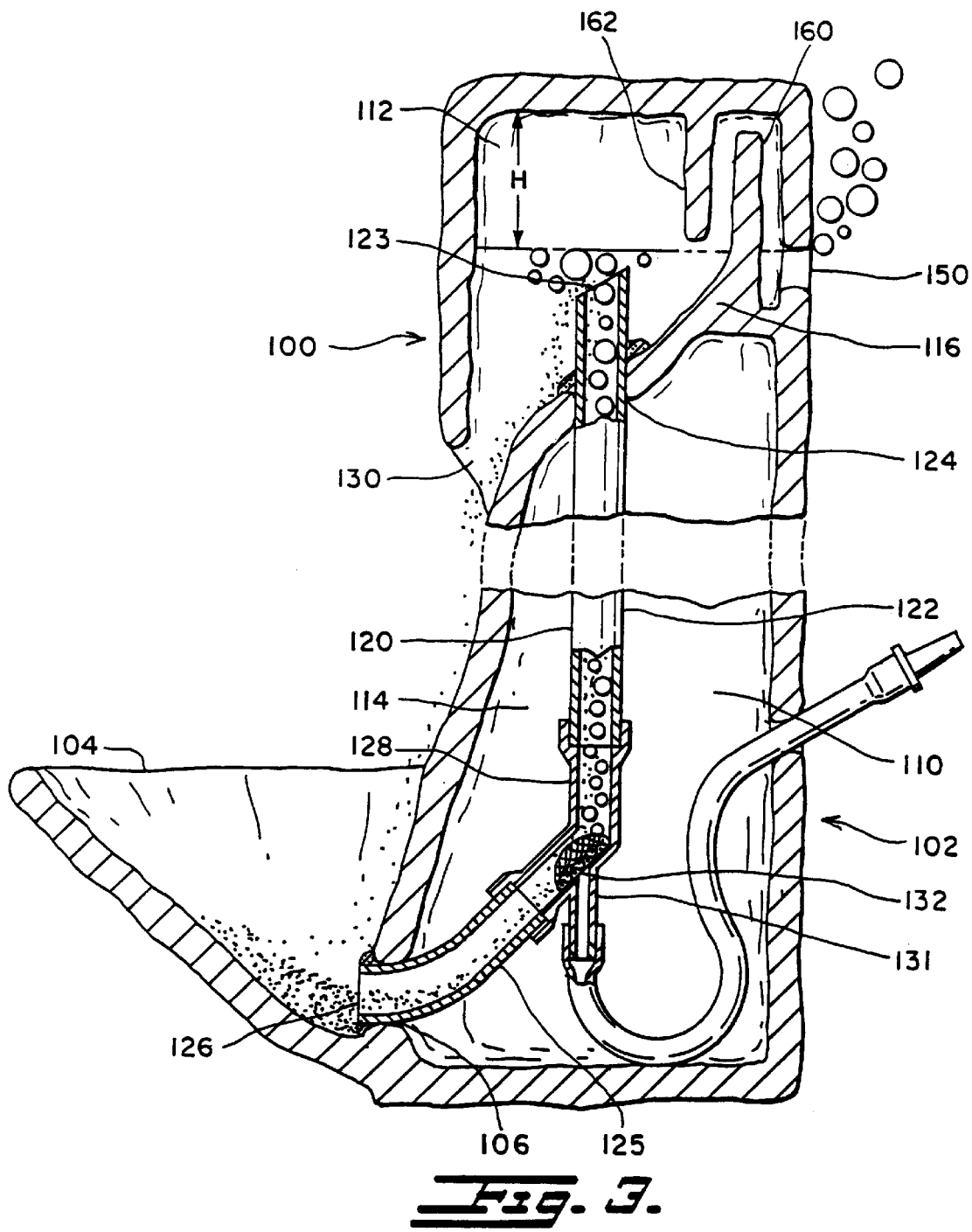
FIG. 3 is cross sectional view of a second embodiment in accordance with the present invention.

As further shown in FIG. 3, the upper chamber 112 of the second embodiment includes a pair of substantially parallel partitions or baffles 160, 162 which define a labyrinth or maze like configuration in advance of the air escape vent 150. As shown in FIG. 3, a first partition 160 extends upwardly from the highest point of the partitioning wall 116 to a point below the top wall of the housing. The second partition 162 depends from the top wall and is spaced laterally from the first partition 160 and extends to a point just above the water level in upper chamber 112.

In operation, as air is forced into the air lift tube 120 through the air intake nozzle 131, sand and water are suctioned up through the air lift tube 120. At the outlet end 123 of the air lift tube 120, which is just beneath the initial water line, sand, air and water are forced up into the upper chamber. The additional water and rising air in the form of bubbles create a disturbance in the upper chamber which causes sand and water to be splashed in all directions. The first and second partitions 160,162 act as shields which repel water and sand from the air outlet. In this manner the combination of the air pocket and partitions insure that sand does not escape the upper chamber, other than through the discharge opening, or coagulate at the air escape vent.

In the remaining preferred embodiments, the drawings will only reflect the changes and adaptations made to the upper chamber. It should be understood that the remainder of the housing including the lower chamber and basin can have any number of shapes without affecting the operation of the preferred embodiments of the present invention.

Referring to FIG. 4, the immersed upper chamber 200 of a third preferred embodiment is shown. The upper chamber 200 includes a partitioning wall 202 between upper and lower chambers through which the outlet end 204 of the air lift tube 206 extends. The partitioning wall is sloped for example, between 45 degrees and 75 degrees to permit the sand expelled from the outlet end 204 to gently exit the upper chamber in a cascading manner through the discharge opening 208. As in the previously discussed embodiments, an air pocket or barrier is introduced between the outlet end 204 of the air lift tube 206 and the top wall 210 of the upper chamber. As can be seen in FIG. 4, the water level 221 within the upper chamber and dimensions of the air pocket or barrier are determined by the placement of the air escape outlet 212.

The upper chamber has been configured to have first and second partitions 220, 222 which redirect sand toward the discharge opening. The partitions 220, 222 as in the previous embodiment, deflect sand and water which may splatter as a result of bursting air bubbles that come into contact with the air barrier. The first partition 220 is positioned within the upper chamber such that it substantially separates the discharge opening 208 and the air escape outlet 212. The second partition 222 which extends from the first partition and is substantially perpendicular thereto acts in this same manner merely to further prevent sand from escaping the upper chamber.

In a fourth and fifth embodiment of the present invention, the upper chamber is adapted to support a valve for controlling the air quantity and water level within the upper chamber. In both these embodiments, the structure of the housing is again preferably a two chamber construction. Unlike the previous embodiments, however, the upper chamber here is preferably laterally offset or cantilevered from the lower chamber. Such an orientation of the upper chamber is preferred as it permits smooth and efficient operation of the valve member.

As shown in FIG. 5 the upper chamber 300 of the fourth embodiment of the present invention includes a partitioning wall 302 through which the outlet end 304 of the air lift tube 306 is in communication with the upper chamber 300. In that regard, the air lift tube 306 may be integral with the partitioning wall 302, or as in the previous embodiments the air lift tube 306 may be a separate section which extends through an opening in the partitioning wall 302. The upper chamber further includes a discharge opening 310 through which the rising sand may exit back towards the collector.

Referring again to FIG. 5, a hollow floating valve element 312 is utilized to regulate the water level within the upper chamber. The floating valve 312 is supported within the upper chamber 300 by an abutment such as a stop screw 314 positioned in a side wall of the upper chamber 300. It should be noted that stop screw 314 is merely one method of supporting the valve 312 within the upper chamber. The benefit of the stop screw 314 is that it may be turned back to a point where the float valve 312 may be removed for cleaning the valve 312 and the interior of the upper chamber 300. Two or more ribs 313 may be formed on the valve 312 to center the valve within the upper chamber 300.

In an unimmersed sand fountain the valve 312 normally rests on the stop screw 314. As the fountain is submerged the force of the rising water biases the floating valve toward an air outlet 320 positioned at the center of the top wall of the upper chamber 320. As shown, the crest 318 of the floating valve 312 is forced into the circular air escape outlet sealing the outlet 320 and prohibiting any further air from escaping. As a result, a pocket of air is trapped in the upper chamber which, as in the previous embodiments, encourages the release of sand which may be trapped in rising air bubbles.

In operation, as air bubbles enter the upper chamber they lift the floating valve which blocks air from escaping the chamber. Consequently, the water level 321 within the upper chamber begins to drop due to the increased air pressure thereby allowing the floating valve to drop and thereby opening the air escape opening repeating the cycle. Thus, the water level in the upper chamber is regulated.

Like the previous embodiments, the valve 312 may be equipped with a partition 322 to deflect any scattered or disturbed grains of sand. In the preferred embodiment, the partition 322 circumscribes the valve 312 adjacent the crest 318.

Additionally it should be noted that for quieter operation the escaping air may be channeled by a flexible tube 324 to the exterior of the aquarium tank. In order to not detract from the aesthetic appearance of the fountain, the tube 324 may be hidden within the sand castle and run under the aquarium tank gravel and over the lip of the tank.

In the fifth embodiment a similar configuration to the configuration utilized in the previous embodiment is shown in FIG. 6. In place of the float valve, a pressure valve element 330 has been substituted to regulate the water level in the upper chamber 301. The pressure valve 330 is nested within a cylinder shaped throat 332 which extends upwardly from the center of the top wall of the upper chamber 301. A valve seat 333 is formed in the bottom of the throat. Seated over the mouth of the throat is a generally circular shaped cap 334 having an air vent 336 which ensures that water fills the throat 332.

Extending from the throat 332 and substantially perpendicular thereto is a horizontal tube section 338 defining an air escape opening 340. As can be seen in FIG. 6, the inlet end 342 of tube section 338 is in communication with throat 332 which permits the rising air to escape the upper chamber 301. A circumferentially toothed circular skirt 339 centers the valve head 350 over the valve seat 333. In operation, as the pressure inside the upper chamber 300 increases the valve 330 is driven upwardly toward the cap 334. The head 350 of the valve, which is piston shaped to prevent rapid up and down movement of the valve 330 is displaced thereby allowing air to escape through the air escape opening 340 until pressure drops. When the pressure subsides the valve 330 again drops and the cycle is renewed.

There has been disclosed heretofore the best embodiment of the invention presently contemplated. However, it is to be understood that various changes and modifications may be made thereto without departing from the spirit of the invention.

What is claimed is:

1. An aquarium fountain for circulating water borne particulate material in a cascading manner comprising:
   a housing having a receptacle for receiving said particulate matter to be circulated, said housing having an upper and lower chamber; said upper and lower chambers being separated by at least one partitioning wall; said upper chamber having a water discharge opening and an air escape opening; said air escape opening extending through a wall of said housing and positioned such as to allow for the formation of an air pocket within said upper chamber after immersion in water;
   a receptacle adjacent the base end of said housing for containing said particulate material;
   a conduit contained within said housing and extending between said receptacle and said upper chamber, said conduit having an inlet end in communication with said receptacle and an outlet end in communication with said upper chamber; and
   an intake nozzle communicating with said conduit for introducing a supply of air into said conduit.

2. A sand fountain in claim 1, wherein said conduit is constructed of a plurality of tube sections.

3. The sand fountain of claim 1, wherein said air escape opening is located on a side wall of said upper chamber.

4. The sand fountain of claim 1, further comprising a first partition baffle depending from a top wall of said upper chamber adjacent said air escape opening.

5. The sand fountain of claim 4, further comprising a second partition baffle extending upwardly from said at least one partitioning wall and laterally spaced from and substantially parallel to said first partition baffle, said partition baffles forming a labyrinth for deflecting sand and water.

6. The sand fountain of claim 1 wherein said upper chamber is laterally offset with respect to said lower chamber.

7. The sand fountain of claim 1, further comprising an elbow shaped tube communicating with said air escape opening and wherein said elbow shaped tube is laterally offset from said outlet end of said conduit.

8. The sand fountain of claim 7, wherein said elbow shaped tube extends outwardly and downwardly from said air escape opening and has an outlet vertically disposed between said air escape opening and said outlet end of said conduit.

9. The sand fountain of claim 1 further comprising a filter disposed over said intake nozzle.

10. The sand fountain of claim 1, wherein said partitioning wall is sloped for directing said particulate material toward said receptacle.

11. The sand fountain of claim 10, further comprising first and second partitions disposed in said upper chamber for directing said particulate material toward said receptacle.

12. The sand fountain of claim 1, further comprising a valve located adjacent said air escape opening for controlling the flow of air therethrough.

13. The sand fountain of claim 12, wherein said valve comprises a float valve operated by water in said upper chamber.

14. The sand fountain of claim 12, wherein said valve comprises a removable abutment disposed in said upper chamber for supporting said valve therein.

15. The sand fountain of claim 12, further comprising a flexible tube communicating with said air escape opening and extending outside said upper chamber for quiet operation of said sand fountain.

16. The sand fountain of claim 12, wherein said valve comprises a pressure valve operated by air pressure in said upper chamber.

17. The sand fountain of claim 16, wherein said pressure valve comprises a throat disposed over said upper chamber and a valve head slidably disposed within said throat.

18. The sand fountain of claim 17, further comprising a circular skirt slidably disposed within said upper chamber for centering said valve head within said throat.

19. The sand fountain of claim 18, further comprising a cap having a vent hole formed therein located over said throat.

20. An underwater sand fountain, comprising:
a collector for receiving sand;
a chamber located above said collector for separating sand from air bubbles;
a conduit having a first end communicating with said collector and a second end communicating with said chamber;
means for injecting air into said conduit adjacent said collector; and
means connected to said chamber for maintaining an air space therein at a predetermined level above said second end of said conduit.

* * * * *